(No Model.)
E. G. LYNCH.
DEVICE FOR FACILITATING RISING OF CREAM FROM MILK.
No. 594,635. Patented Nov. 30, 1897.
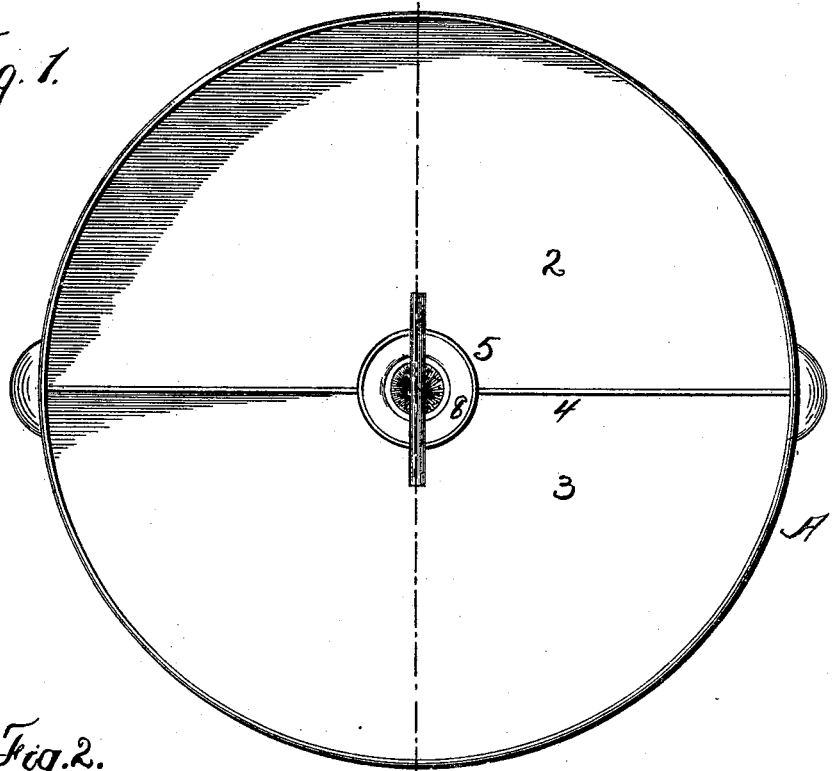
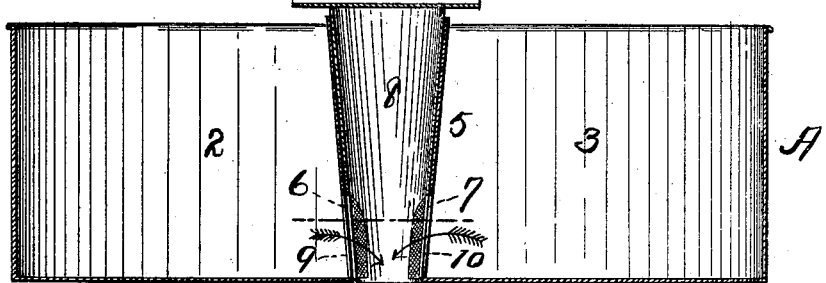
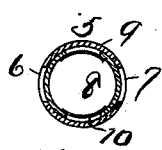
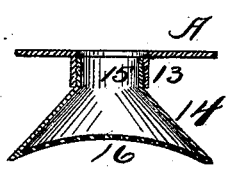
WITNESSES:
Charles W. Marvin
Mary A. Franklin
INVENTOR
Edwin G. Lynch
BY
Smith & Renison
ATTORNEYS.
THE NORRIS PETERS CO., PHOTO-LITHO., WASHINGTON, D. C.

United States Patent Office.

EDWIN G. LYNCH, OF PARISH, NEW YORK.

DEVICE FOR FACILITATING RISING OF CREAM FROM MILK.

SPECIFICATION forming part of Letters Patent No. 594,635, dated November 30, 1897.

Application filed June 25, 1897. Serial No. 642,231. (No model.)

*To all whom it may concern:*

Be it known that I, EDWIN G. LYNCH, of Parish, in the county of Oswego, in the State of New York, have invented new and useful Improvements in Milk Mixers, Strainers, and Coolers, of which the following, taken in connection with the accompanying drawings, is a full, clear, and exact description.

My invention relates to apparatus for separating cream from milk.

My object is to produce a novel apparatus adapted to assist in raising the cream upon the milk or separating the cream from the milk, comprising a suitable receiver, divided into compartments for water and milk, provided with a central valve-seat on the line of the partition and opening on opposite sides into both compartments, a valve adapted to rotate in said seat and provided with strainer-ports on opposite sides adapted to coincide with the valve-seat ports to strain the milk on one side and water on the other into the valve-body and mix and commingle them, and an auxiliary strainer or separator and aerator combined, through which the milk and water flows in streams into a suitable receptacle.

It is constructed as follows, reference being had to the accompanying drawings, in which—

Figure 1 is a top plan of the apparatus. Fig. 2 is a vertical section thereof upon the dotted line in Fig. 1. Fig. 3 is a transverse section of the valve-seat and valve, showing the valve open. Fig. 4 is a like view of the same, showing the valve closed. Fig. 5 is a section of a strainer and aerator combined.

A is a suitable receiver divided into compartments 2 and 3 by a partition 4, one being for milk and the other for water. At a suitable point, as the center, a valve-seat 5 is erected, the partition being secured to its outside and provided with ports 6 and 7 on opposite sides, one opening into each compartment or chamber. In this seat a valve 8 is removably mounted, provided with strainer-ports 9 and 10, covered with suitable straining material and adapted to coincide more or less with the valve-seat ports by the rotation of the valve.

In Fig. 2 the valve is shown as flanged inwardly at 11 to removably support an outwardly-flanged conical or tubular strainer 12, which operates to divide the milk and water up into minute streams and thereby further mix and commingle them and to bring the water in better contact with the globules of milk to expand them, whereby the separation of the cream is much more readily effected or brought about in addition to the like effect of the passage of the milk and water through the primary strainer.

In Fig. 5 an auxiliary strainer and aerator is shown, comprising a flange 13 upon the bottom of the receiver, a strainer proper comprising a body 14, provided with a neck 15, adapted to be suitably and removably inserted into or to fit over said flange, either by frictional contact or by screwing thereinto or thereon, and having a concave bottom 16, suitably perforated to strain and aerate the milk and water.

Ice can be used in the water-chamber to cool it and the milk, suitable means being employed, when desired, to retain the ice in any particular part thereof.

It will be seen that the discharge of milk and water can be regulated according to the degree of the opening of the valve, it being shown in Fig. 3 as wide open, and that to whatever degree it is opened the discharge of milk and water will be equal.

It will be observed that the quality of the milk is deteriorated, but after the cream has been separated from it it is no longer an article of merchandise, but is utilized as whey or refuse.

Having described my invention, what I claim, and desire to secure by Letters Patent, is—

1. A device for facilitating the rising of cream from milk, comprising a receiver divided into chambers for the milk and water, a valve-body erected in said receiver and connected by ports to both of said compartments, and a rotating valve provided with strainer-ports adapted to equally coincide with said seat-ports whereby an equal and regulated discharge of the milk and water is obtained through a valve common to both.

2. A device for facilitating the rising of cream from milk, comprising a receiver divided into chambers for the milk and water, a valve-body erected in said receiver and connected by ports to both of said compartments, and a rotating valve provided with strainer-ports adapted to equally coincide with said seat-ports whereby an equal and regulated discharge of the milk and water is obtained through a valve common to both, and an auxiliary separator and aerator combined detachably connected to said receiver and receiving the discharge through the valve.

In witness whereof I have hereunto set my hand this 19th day of June, 1897.

EDWIN G. LYNCH.

In presence of—
 C. W. SMITH,
 HOWARD P. DENISON.